United States Patent [19]

Satoh

[11] Patent Number: 5,153,746
[45] Date of Patent: Oct. 6, 1992

[54] DOCUMENT PROCESSING APPARATUS WITH FACSIMILE FUNCTION

[75] Inventor: Hiroko Satoh, Oome, Japan

[73] Assignee: Kabushiki Kaisha Toshiba, Kawasaki, Japan

[21] Appl. No.: 622,149

[22] Filed: Dec. 3, 1990

Related U.S. Application Data

[63] Continuation of Ser. No. 515,331, Apr. 27, 1990, abandoned, which is a continuation of Ser. No. 321,128, Mar. 9, 1989, abandoned.

[30] Foreign Application Priority Data

| Mar. 10, 1988 | [JP] | Japan | 63-56853 |
| Mar. 10, 1988 | [JP] | Japan | 63-56854 |
| Mar. 11, 1988 | [JP] | Japan | 63-57711 |

[51] Int. Cl.⁵ .................................. H01N 00/00
[52] U.S. Cl. .................................. 358/401; 358/443
[58] Field of Search ............ 358/401, 443, 448, 404, 358/444, 467, 470, 449, 474

[56] References Cited

U.S. PATENT DOCUMENTS

| 4,249,216 | 2/1981 | Kanda | 358/440 |
| 4,655,622 | 4/1987 | Aoki . | |
| 4,774,590 | 9/1988 | Haganuma et al. | 358/401 |
| 4,829,385 | 5/1989 | Takezawa | 358/470 |
| 4,975,783 | 12/1990 | Takaoka | 358/444 |

FOREIGN PATENT DOCUMENTS

| 55-39409 | 3/1980 | Japan . | |
| 56-12170 | 2/1981 | Japan . | |
| 0088963 | 5/1983 | Japan | 358/443 |
| 58-223953 | 12/1983 | Japan . | |
| 0123360 | 7/1984 | Japan | 358/401 |

OTHER PUBLICATIONS

Technical Research Report of Electronics and Communications Engineers of Japan, I.E. 78-61 (Ogawa et al.), pp. 57-64 in particular, p. 60 (§4.2).
Technical Paper on Facsimile Application for Data Communication Network (Hiroyama et al.), Nippon Telegraph & Telephone Public Corp., pp. 3314-3319.

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

A document-processing apparatus with a facsimile function includes a document-processing unit, and an adaptor, detachably connected to the document-processing unit, for facsimile-transmitting the document processed by the document-processing unit. The document processing unit and the adaptor can operate in parallel with each other.

20 Claims, 9 Drawing Sheets

| FILE NAME | FACSIMILE TRANSMISSION |
|---|---|
| NAP | TRANSMISSION OK |
| MAP | TRANSMISSION ERROR ERROR CODE 00717 |
| OAP | DESTINATION CHANNEL NOT CONNECTED |

FIG. 5

| FILE NAME | ADD. | RESOLUTION | PRINTED/ NOT PRINTED | ERROR CODE | TEL NO |
|---|---|---|---|---|---|
| FAx01 | OO | 1 | O | | 0123-456-7890 |
| FAx02 | AB | O | O | | 0123-567-8901 |
| | | | | | |

OO → AREA IN WHICH FAX 01 IS STORED

FIG. 10

| CHARACTER CODE | A | B | C | D |
|---|---|---|---|---|
| X POSITION | $x_1$ | $x_2$ | $x_3$ | $x_4$ |
| Y POSITION | 0 | 0 | 0 | 0 |
| ZONE NUMBER | 0 | 0 | 0 | 0 |

F I G. 6A

| CHARACTER CODE | X | 2 | Y | |
|---|---|---|---|---|
| X POSITION | $x_1$ | $x_2$ | $x_3$ | |
| Y POSITION | 0 | n | 0 | |
| ZONE NUMBER | 0 | 0 | 0 | |

DOCUMENT PROCESSING APPARATUS WITH FACSIMILE FUNCTION

This application is a continuation of application Ser. No. 07/515,331 filed Apr. 27, 1990 now abandoned, which is continuation of application Ser. No. 07/321,128 filed Mar. 9, 1989 now abandoned.

BACKGROUND OF THE INVENTION

1. Field of the Invention

The present invention relates to a document-processing apparatus which can transmit a processed document to a facsimile apparatus and can receive a transmission signal therefrom.

2. Description of the Related Art

An apparatus for transmitting a document processed by a document-processing apparatus (word processor) to a facsimile apparatus is disclosed in, for example, Japanese Patent Publication (Kokoku) No. 62-59505. The apparatus disclosed in this patent publication comprises a document-processing apparatus and a facsimile terminal.

In the above apparatus, the document-processing apparatus develops character data into image data (image pattern data), sequentially reads the developed image data in the column direction (a dot direction of a printer head) in units of a predetermined number of bits, and then transmits the read data to the facsimile terminal. The facsimile terminal stores image data corresponding to one line of a document in a buffer memory, reads the image data in the buffer memory in the row direction, compresses the read data, and then transmits the compressed data to a destination facsimile apparatus.

In the above apparatus, however, the facsimile terminal must perform segmentation in the row direction, coding, compression, and transmission of image data. Therefore, since a heavy load is imposed on the facsimile apparatus, the data transfer rate is reduced.

SUMMARY OF THE INVENTION

It is an object of the present invention to provide a document-processing apparatus with a facsimile transmission function capable of facsimile-transmitting document data with high efficiency.

In order to achieve the above object, a document-processing apparatus according to the present invention, having document processing means for processing a document, and adaptor means, connected to said document-processing means so as to operate in parallel with said document-processing means, for facsimile-transmitting the document processed by said document-processing means.

With the above arrangement, the document-processing apparatus main body and the adaptor operate in parallel with each other, with the result that data can be facsimile-transmitted with a higher efficiency than in the case of a conventional apparatus, thereby improving the data transfer rate.

DETAILED DESCRIPTION OF THE PREFERRED EMBODIMENT

Figure 1:
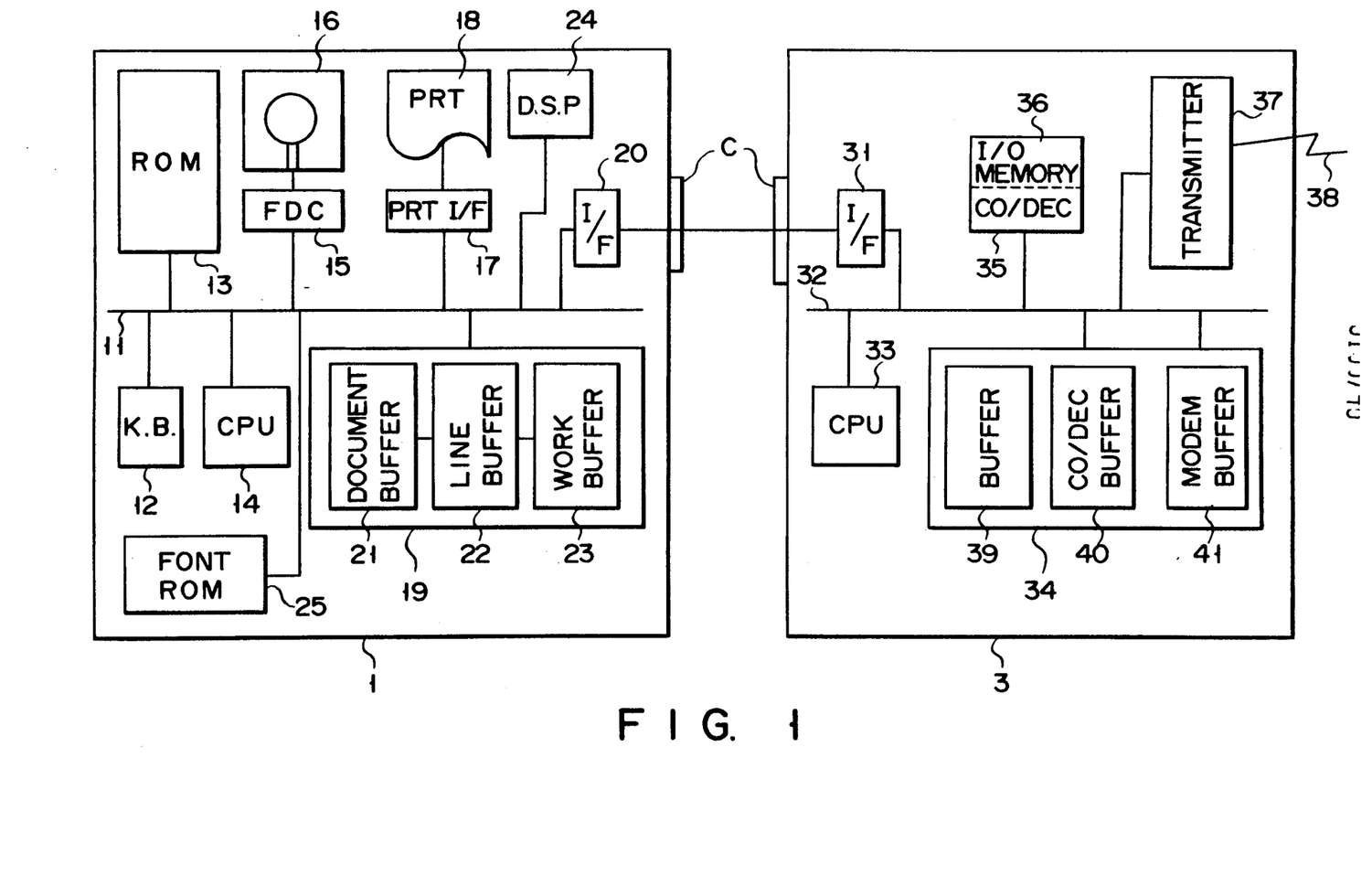
FIG. 1 is a block diagram showing an arrangement of a document-processing apparatus according to an embodiment of the present invention.

A document-processing apparatus according to an embodiment of the present invention will now be described below, with reference to the accompanying drawings. As shown in FIG. 1, the document-processing apparatus according to this embodiment comprises a host system (document-processing apparatus main body) 1 and an adaptor 3 which is detachably attached to the host system 1 through the connectors C.

Figure 2:
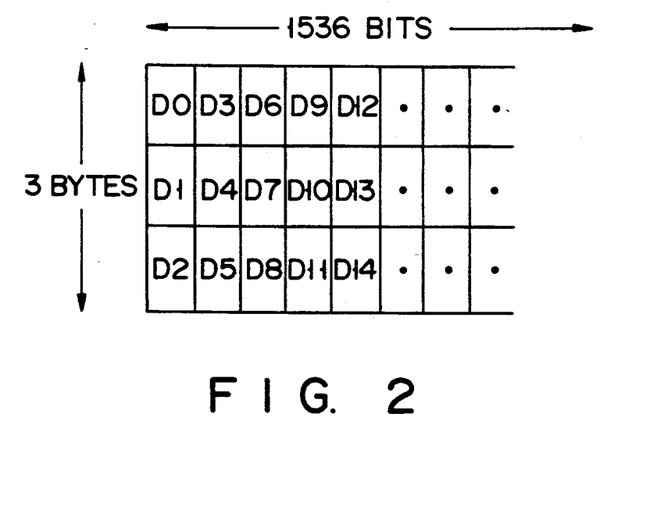
FIGS. 2 and 8 are views for explaining methods of segmenting image data, respectively.

The host system 1 comprises an internal bus 11; a keyboard 12; a ROM 13 for storing programs for document processing, transmitting and receiving the facsimile data according to this invention, and so on; a CPU (Central Processing Unit) 14; and external memory units (in FIG. 1, a floppy disk drive (FDD) 16; and a floppy disk controller (FDC) 15); a buffer circuit 19; a serial printer 18; a printer interface 17; a display 24; and an interface 20. The keyboard 12 is connected to the internal bus 11 and inputs information such as character codes and a plurality of commands. The ROM 13 is connected to the bus 11. The program stored in the ROM 13 in fetched by the CPU 14 and executed. The CPU 14 stores character codes and control codes (line feed codes, page reneweal codes, TAG codes) in the document buffer 21 on the basis of the information input from the keyboard 12. The CPU 14 is connected to the bus 11, executes other programs stored in the ROM 13, and controls a document processing operation, a printing operation, a fascimile-transmitting/receiving operation, and the like. The FDD 16 stores documents and the like. The FDC 15 is connected to the FDD 16 and the bus 11, and controls the FDD 16. The printer 18 prints characters and the like. The buffer circuit 19 is connected to the bus 11, and comprises a document buffer 21; a line buffer 22; and a work buffer 23. The document buffer 21 stores processed documents, document information read out from the FDD 16, and the like. The CPU 14 reads out the character codes and accesses the font ROM 25 which stores character dot patterns in accordance with the character codes. Then, the CPU 14 reads out the dot patterns corresponding to the character codes and stores them in the line buffer 22. Attribute information indicating, for example, superscript, subscript and enlargement of characters is added to the character codes. When the CPU 14 stores the dot pattern in the line buffer 22, the CPU 14 refers to the attribute information. The line buffer 22 is a bit map memory and stores bit data corresponding to one line, which is printed by one scan of the printing head of the serial printer 18, of a document stored in the document buffer 21 each line being. In this embodiment, a character pattern is expressed by 24×24 dots (bits). As shown in FIG. 2, the line buffer 22 has a capacity of three bytes (24 bits) in the column direction and 1,536 bits in the row direction. The work buffer 23 stores image patterns to be transferred to a facsimile terminal, and has a capacity twice that of the line buffer 22, i.e., six bytes (48 bits) in the column direction and 1,536 bits in the row direction. The printer interface 17 is connected to the printer 18 and the bus 11. The display 24 and the interface 20 are also connected to the bus 11, the display 24 displaying operation menus, documents, cursors, and the like.

The adaptor 3 comprises an interface 31; an internal bus 32; a CPU 33; a coding/decoding (CO/DEC) circuit 35; an I/0 memory 36; and a transmitter 37.

The interface 31 is connected to the interface 20 and controls data transmission therebetween. The bus 32 is connected to the interface 31 and transmits data. The CPU 33 is connected to the bus 32 and controls the facsimile-transmitting/receiving operation and the like, in accordance with predetermined programs. A buffer circuit 34 is connected to the bus 32 and comprises a buffer memory 39; a coding/decoding (CO/DEC) buffer 40; and a modem buffer 41. The CO/DEC circuit 35 is connected to the bus 32, codes an image to be transmitted, and decodes received facsimile data. The I/0 memory 36 is connected to the CO/DEC circuit 35 and temporarily stores data to be coded or decoded. The transmitter 37 is connected to the bus 32 and a communication (facsimile) channel 38, and controls data transmission.

The operation of the arrangement shown in FIG. 1 will be described below.

(A) Document Processing Operation

Figure 3:
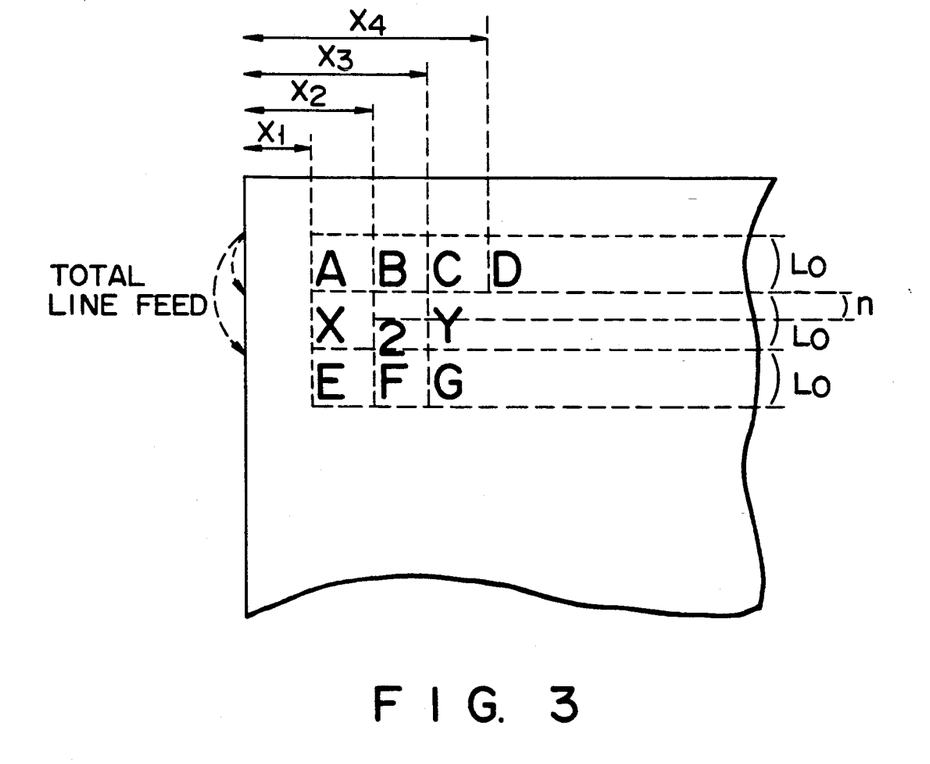
FIG. 3 is a view showing a document.
Figure 4:
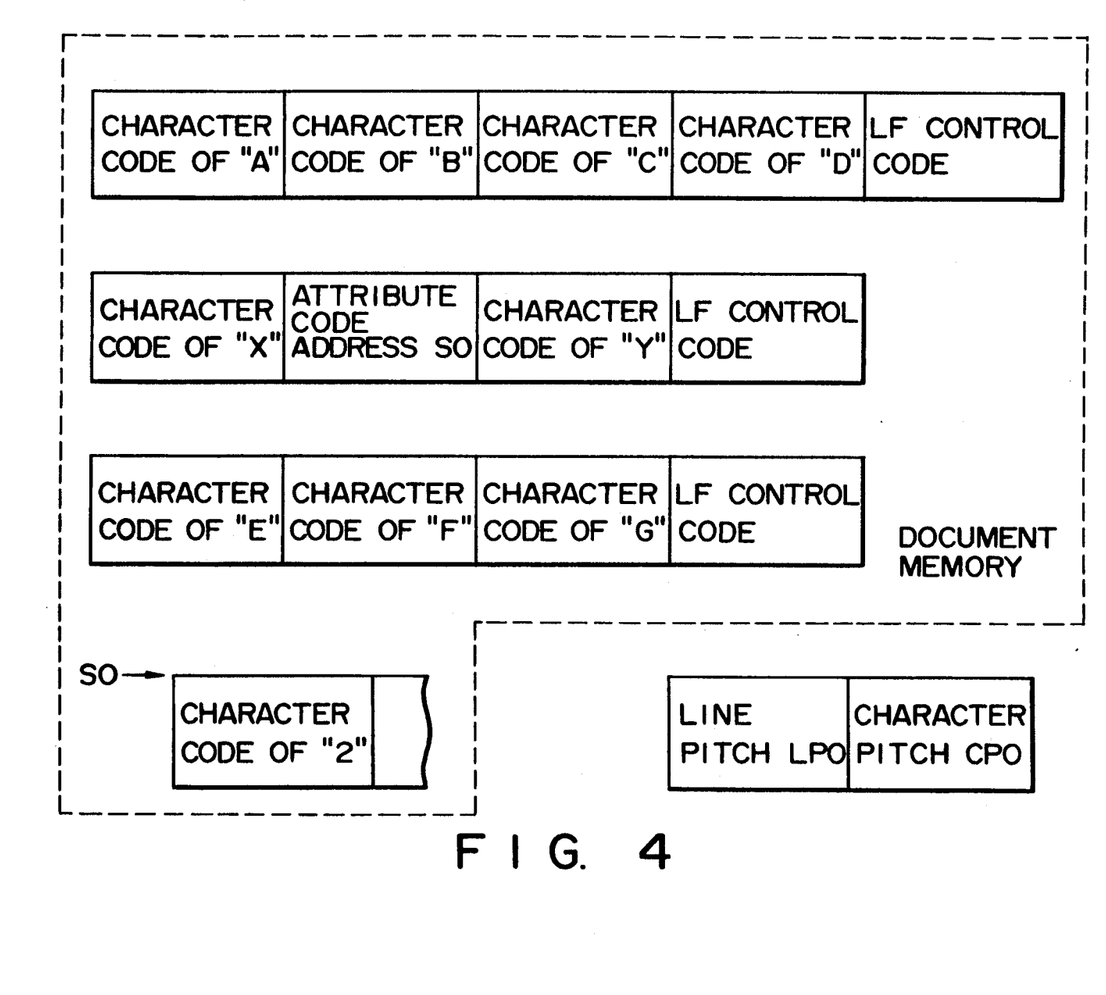
FIG. 4 is a view showing a format of the document shown in FIG. 3, when it is stored in a document buffer.

The CPU processes a document under the control of the program stored in the ROM 14 on the basis of an input from the keyboard 12. The CPU 14 stores the processed document in the document buffer 21 in the form of document data consisting of a combination of character codes attribute codes and control codes and the like. For example, if a document (ABCD $X_2Y$ EFG) shown in FIG. 3 is processed, character and control codes are stored in the buffer 21 in the form as shown in FIG. 4. If a character is ornamented as "2" on the second line of the document shown in FIG. 3, an attribute code representing the contents of the character ornamentation and a start address (attribute address) of a storage area in which detailed information concerned with the ornamentation are stored in the document memory. Referring to FIG. 4, a code representing ornamentation of a subscript character and an address SO are set in the second character on the second line. A storage area in which a start address is SO stores that the character "2" is inferior. The document memory stores, in its other areas, data LPO representing a line pitch for printing performed by the printer 18, data CPO representing a character pitch, and data representing the size of a character, the number of lines of one page, the number of characters of one line and the like (not shown).

A document being processed or a processed document is displayed on a screen of the display 24 in accordance with the stored contents in the document buffer 21.

(B) Document Storing Operation

The CPU 14 supplies a document stored in the document buffer 21 to the FDC 15 in response to a key operation designating storage of a document. The FDC 15 controls the FDD 16 so that the document is stored in a floppy disk or the like. For each of the document, a table, on which file name and storage address (sector address) are registered is formed. By designating the file name, a designated document is stored into document buffer 21.

(C) Printing Operation

In this embodiment, a document stored in the document buffer 21 is printed. If a document to be printed is stored in a floppy disk, the document is transferred from the floppy disk to the buffer 21, and then printing is performed.

Figure 6A:
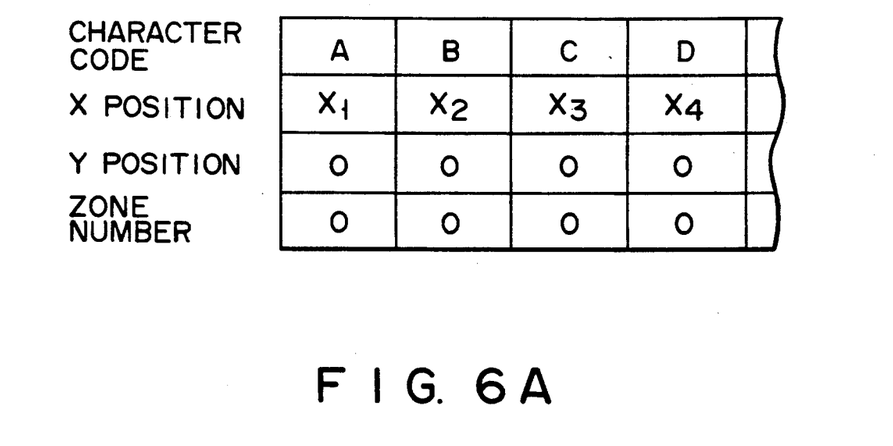
FIGS. 6A and 6B are views showing tables for printing, respectively.
Figure 6B:
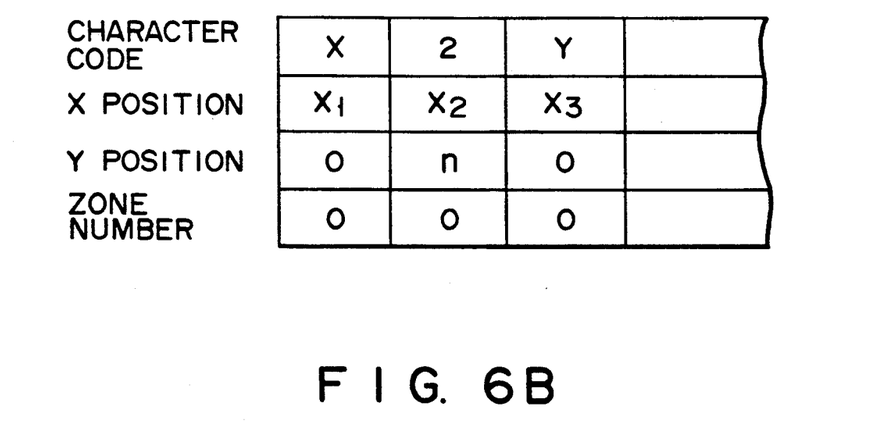

In order to perform printing, the CPU 14 forms a table representing X and Y positions, and zone number of each character in units of lines of the document stored in the buffer 21, before the printing. The X position represents a position of a character in an X direction (a moving direction of a printer head). The Y position represents a position of a character in a Y direction (a feeding direction of a sheet). When the number of dots of a character to be printed in the Y direction is larger than 24 which is the number of dots of the line buffer 22 in the column direction, it is impossible to print all characters of one line by one scan of the printing head. Therefore, the characters have to be divided to some zones and printed by a plurality of scans. The zone number represents a zone which is currently printed on the characters. For example, in order to print the first line "ABCD" shown in FIG. 3, distances X1 to X4 from the end of a sheet to the ends of characters are set in an X position area of the table; data 0 are stored in a Y position area thereof because the positions of the characters "ABCD" are the same in the Y direction; and data 0 are set in zone number areas thereof because the size of the characters "ABCD" is normal size of 24 dots in the Y direction, as shown in FIG. 6A. Similarly, in order to print the second line "$X_2Y$", X1 to X3 are set in the X position areas of the table; and data 0 are set in the zone number areas thereof, as shown in FIG. 6B. Since the character "2" is located below the characters "X and Y" by a distance n, data "0n0" is set in the Y position areas, as shown in FIG. 6B.

In unit of line, the CPU 14 accesses the font ROM 25 in accordance with the table, thereby storing image data (image pattern), which is to be printed by one scan of the printing head, into the document buffer 21. That is, the CPU 14 accesses the font ROM 25 based on the character codes, reads the dots pattern of the image data in the column direction (8 dots×3), and stores the read data in the line buffer 22. In order to cause the printer 18 to print the characters, the CPU 14 reads the contents in the line buffer in the column direction and sequentially supplies them to the printer interface 17.

If the printer 18 is to print a line containing a character having a different Y position, the printer 18 prints characters having the same Y position by one scan, and the characters having the other Y position are printed after the paper is fed up to the Y position. For example, the second line "$X_2Y$" shown in FIG. 3, the CPU 14 prints only the characters "X and Y" having the Y position of "0" first. The CPU 14 then feeds a sheet by a length n and prints only the character "2" having the Y position of n.

Figure 5:
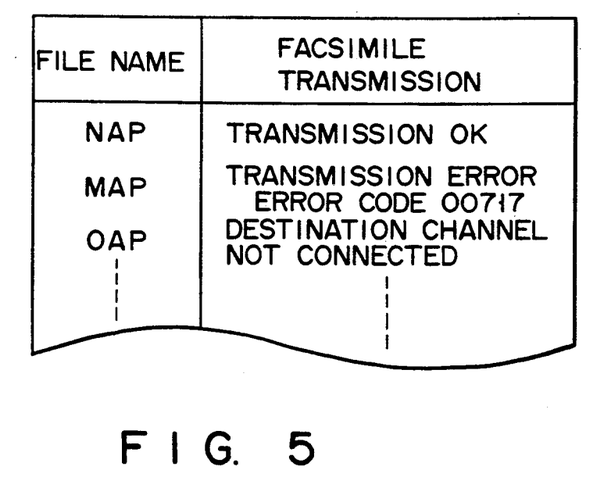
FIG. 5 is a view showing a table indicating the states of the transmission.

When printing is finished, the CPU 14 sets data representing that the printing is finished in a print column of a document table shown in FIG. 5.

A printing method utilizing such a table is described in, e.g., U.S. Pat. No. 4,655,622 with reference to FIGS. 12, 13 and 14 thereof.

(D) Transmitting Operation

When a document processed by the document-processing apparatus is to be transferred from a facsimile apparatus to another facsimile apparatus, the host system 1 and the adaptor 3 operate in parallel with each other. a) An operation of the host system 1 will be described below with reference to FIGS. 1 to 8.

In response to a key operation designating transmission, a transmitting operation is executed in accordance with the following procedure.

If a document to be transmitted is stored in a floppy disk, the FDC 15 controls the FDD 16 to read out a desired document information from the floppy disk. The CPU 14 stores the readout document information into the document buffer 21. The document to be transferred may be a document (stored in the document buffer 21) now in process. The CPU 14 then performs data processing shown in FIGS. 7A and 7B. The CPU 14 sets initial values (in this embodiment, values "0") in a line feed pointer register P and accumulated line number register Pa, registers Pb and Pc, and total line feed register TLF (step Sl). The CPU 14 checks the contents in the document buffer 21 to determine whether character data is present on a line to be developed into image data (step S2). If no character data is present on the line to be developed (e.g., if only a line feed code is present), the flow advances to step S5 to be described later. If character data is present on the line to be developed, the CPU 14 accesses the font ROM 25 to develop the character code into image data (image pattern) as in printing. This developing operation is performed for each line on the basis of the printing tables, shown in FIGS. 6A and 6B, as in printing.

The CPU 14 stores the obtained image data in the line buffer 22 (step S3). The operation for developing the image data to be transferred in the line buffer 22 is performed in the same manner as the operation for developing the image data to be printed in the line buffer 22. Therefore, programs sequence for storing image data in the line buffer 22 for printing can be partially used for obtaining the image data to be transferred.

Figure 9A:
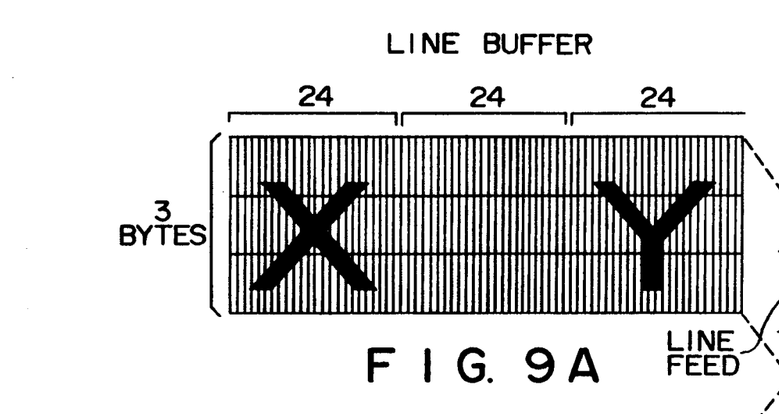
FIGS. 9A and 9B are views for explaining an operation performed by a line buffer during facsimile transmission.
Figure 9B:
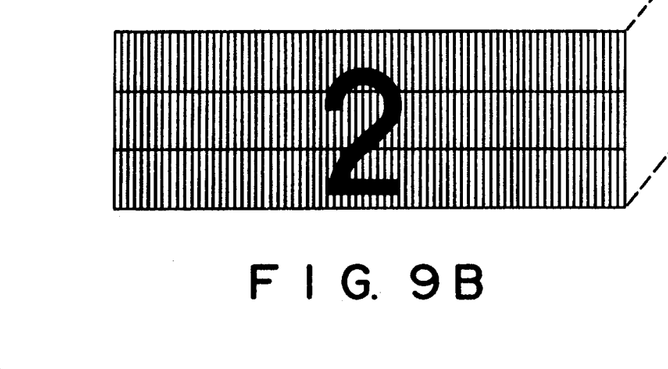

When the image data, which is printed by one scan of the printing read, is stored in the line buffer 22, the flow advances to step S4. In step S4, the CPU 14 reads the image data stored in the buffer 22 in the row direction in units of a predetermined number of bits. In this case, the row direction is a scan direction of the facsimile apparatus. The CPU 14 ORs the read image data with data already stored in the work buffer 23 from a line designated by the value of the line feed pointer register P, and writes the result. In this embodiment, facsimile transfer of the document uses the program sequence for printing partially. Therefore, as shown in FIGS. 9A and 9B, when there are characters having different Y positions in one line, the image pattern of the line must be stored in line buffer 22 in a plurality of times. In facsimile transfer, however, if the image pattern shown in FIG. 9B is transferred, after the image pattern shown in FIG. 9A was transferred, the image shown in FIG. 9C can not be obtained. Therefore, the image pattern of one line has to be synthesized and stored in the work buffer 23. More specifically, the CPU 14 reads the 0th byte data E0 on the first line in the line buffer 22 shown in FIG. 8. The CPU 14 ORs the read image data with data stored at a start address (byte NO.0) of a line of the work buffer 23 designated by the pointer P, and writes the result at that address. The CPU 14 then reads out byte data El from the line buffer 22, ORs the readout data with the data at 2nd address of the first line of the buffer 23, and writes the result. The same operation is repeatedly performed for byte data E2, E3, ... When a writing operation for the buffer 23 is finished, the CPU 14 saves a value (P) currently held by the line feed pointer register into the resister Pc (step S3).

In step S5, the CPU 14 checks whether a line feed is necessary, i.e. a line feed code is present. The CPU 14 refers the tables shown in FIGS. 6A and 6B to check whether there is character which is not yet developed to the image pattern or line feed code. If no line feed is requested (in the case of complete overwriting or the like), the flow returns to step S2. If a line feed code is present, the flow advances to step S6.

In step S6, the CPU 14 saves the number of accumulated (scan) lines of facsimile sheets stored in the accumulated line number register Pa into the register Pb. The CPU 14 fetches line feed LF (step S7). For example, in the case of storing a pattern of subscript, into the work buffer 23, the amount of the line feed (LF) is the minimum value, excluding 0 in the Y position data in the tables shown in FIGS. 6A and 6B. In the case of line feed from one line to the next, the line feed amount (LF) is a value obtained by subtracting the sum of paper feed amount executed to store all the character patterns of the present line into the work buffer 23; from line pitch (LP0) shown in FIG. 4 and its unit is the minimum value of feeding paper by the printer 18. The CPU 14 adds the current line feed LF to the total line feed stored in total line feed register (TLF), thereby obtaining new total line feed (step S8). The total line feed is a value indicating up to where the dot image generation to-be-transmitted page and its unit is the minimum paper feed pitch by the printer 18. The CPU 14 converts the obtained total line feed into the number of scan lines of the facsimile apparatus. The CPU 14 sets the obtained scan line number in the register Pa (step S9). The CPU 14 adds an increment (Pa - Pb) in accumulated line number to the value held by the line feed pointer register P (step S10). The CPU 14 checks whether no character pattern is present on the work buffer 23 and the value of the pointer register P is not 0 (step Sll). If no character pattern is present and the value of the pointer register P is not 0, the flow advances to step S12. In step S12, the CPU 14 sends the value held by the pointer register P as the number of blank lines in the form of code data or a command to the adaptor 3.

The CPU 14 checks whether the transmission is completely performed for all the lines in one page of the document (step S13). If the operation is not finished, the flow returns to step S2, and the CPU 14 executes the same operation for the next line of the document stored in the buffer 21.

If NO is determined in step Sll, i.e., if the character pattern is present in the work buffer 23 or the value held by the line feed pointer P is "0", the flow advances to step S14. In step S14, the CPU 14 checks whether the value of the pointer register P is 24 or more. If the value of pointer register P is less than 24 (23 or less), it means that the other patterns (e.g. subscript pattern) which are to be synthesized in work buffer 23, exist, and the flow jumps to step S13. If the value of pointer register P is 24 or more, it means that all the patterns to be transmitted are already stored up to the line indicated by the pointer register P in work buffer 23, and the CPU 14 executes step S15 and checks whether the number of the lines to be fed (Pa - Pb) is 24 or more. If the number of lines to be fed (Pa - Pb) is 24 or more, the flow advances to step S16, and the CPU 14 reads image data corresponding to 24 lines from the value of the register PC in the row direction (scan direction of the facsimile apparatus) and sends the read data to the adaptor 3 (step S16). The CPU 14 transmits the number of lines to be [(Pa - Pb) - 24] as the number of blank lines in the process of a command (or code data) to the adaptor 3 (step S17). The CPU 14 clears the contents in the line buffer 22 (step S18), and resets the line feed pointer register P (step S19). The flow advances to step S13.

If the CPU 14 determines in step S15 that the number of lines to be fed (Pa - Pb) is less than 24, the flow advances to step S20. In step S20, the CPU 14 reads data corresponding to 24 start lines of the work buffer 23 in the row direction and transmits the read data to the adaptor 3, decrements the value held by the line feed pointer register P by 24 (step S21), and updates the line buffer 22 (compresses the contents of the buffer 22 by 24 lines) (step S22). The flow then advances to step S13.

The operation shown in the flowcharts of FIGS. 7A and 7B will be described in more detail below assuming that the document shown in FIG. 3 is to be transferred to a destination facsimile apparatus.

In step Sl, "0"s are set in the register P, Pa, Pb, Pc and TLF, before the transmission of the image data of the desired page. Since the character data "ABCD" is present on the start line, the flow advances from step S2 to S3. The CPU 14 forms the table shown in FIG. 6A and stores the image data of characters "ABCD" in the line buffer 22.

The CPU 14 reads the image pattern in the buffer 22 in the row direction and writes the read pattern in the buffer 22 (step S4). In this manner, the image data of characters "ABCD" is stored in the work buffer 23. The value "0" held by the line feed pointer register P is saved in the register Pc. Since all character pattern of the first line are stored in the work buffer 23 and the line feed is indicated by the line feed code, the flow advances to step S6. The value "0" held by the register Pa is saved in the pointer Pb. The CPU 14 fetches line feed from a printing routine (step S7). In the case of FIG. 3, the line feed is L0. The line feed L0 is added to a set value of register TLF (present 0), thereby obtaining a new total line feed L0 (step S8). The minimum amount of the paper feed by printer 18 is 1/120 inch, and the line pitch of the facsimile is 1/180 inch. Therefore, the CPU 14 multiplies the above total line feed by 180/120 (3/2) to convert the total line feed into the number of scan lines of the facsimile apparatus, and sets the obtained value in the register Pa (step S9). The CPU 14 obtains the scan line number (Pa - Pb) corresponding to the line feed L0 and adds the obtained value to the value (0) of the pointer register P. Assuming that the line feed L0 corresponds to the number of scan lines "30", the value held by the register P becomes 30. The character pattern "ABCD" is present in the work buffer 23, the value of the pointer register P is 30, and the line number (Pa - Pb) is 30. Therefore, the flow advances to step S16 via steps Sll, S14 and S15. The image data corresponding to 24 lines from the 0th line indicated by the value "0" of the register Pc, (the 0th line to 23rd line), i.e., the data representing the characters "ABCD" is read line by line and transferred to the adaptor 3 (step S16). A difference 6 between line number (Pa - Pb)=30 and 24 is transferred as the number of blank lines in the process of a command to the adaptor 3 (step S17). The contents of the line buffer 22 are cleared (step S18), and 0 is set in the line feed pointer register P (step S20).

Figure 9C:
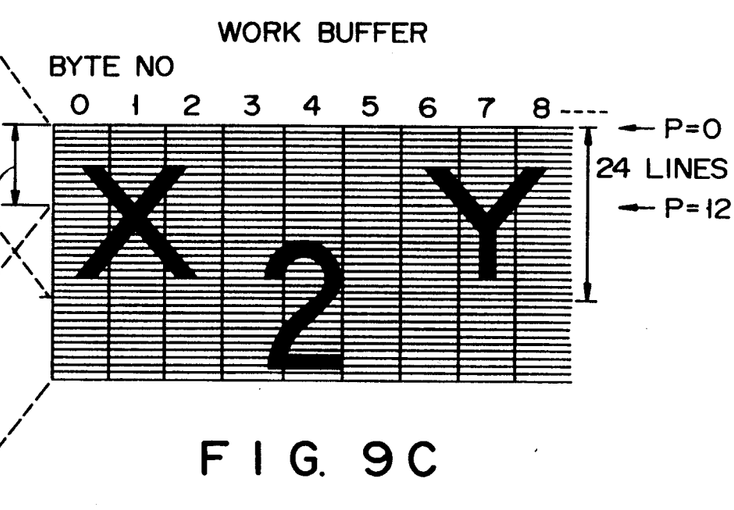
FIG. 9C is a view for explaining an operation performed by a work buffer during facsimile transmission.

An operation is started for the transmission of the second line "$X_2Y$". In step S2, the presence of the characters is detected, and the table shown in FIG. 6B is formed in step S3. On the basis of this table, the CPU 14 stores the image data of the characters "X" and "Y" having 0s at the Y positions in the line buffer 22 as shown in FIG. 9A. Since the value held by the line feed pointer register P is "0", the CPU 14 writes the pattern "X Y" from the 0th to 23rd lines of the work buffer 23, and saves the value "0" of the line feed pointer register P in the register Pc (step S4). As shown in FIG. 3, since line feed is present between "X Y" and "2", the flow advances to step S6. The accumulated line number "30" held in the register Pa is saved in the register Pb (step S6). The line feed n (shown in FIG. 3) is fetched from the table (step S7), and a new total line feed (L0 +n) is calculated and stored in the register TLF (step S8). The line pitch to the next line is changed to (LPO-n). The total line feed (L0+n) is converted into the accumulated line number of the facsimile apparatus, and the converted line number is set in the register Pa (step S9). If the accumulated line number is 42, an increment Pa - Pb in the accumulated line number is 12, and therefore the value held by the line feed pointer register P is 12 (step S10). Since the character pattern is present in the work buffer 23, the flow advances from step Sll to S14. Since the value of the pointer register P is 12, the flow jumps from step S14 to S13 and then returns to step S2. In step S2, the presence of the character data "2" is detected. In step S3, the data "2" is developed in the line buffer 22 as shown in FIG. 9B (step S3). Since the value of the pointer register P is 12, the image data in the line buffer is ORed with the data of the 12th to 35th lines in the work buffer 23, and the result is written in the work buffer 23. In this manner, as shown in FIG. 9C, the image pattern of the characters "$X_2Y$" is stored in the buffer 23. The value "12" held by the line feed pointer register P is saved in the register Pc (step S4). Since line feed is present after the second line, the flow advances to step S6. The accumulated line number "42" held in the register Pa is saved in the register Pb (step S6), and line feed is fetched (step S7). Here, n is subtracted from each Y position data (excluding 0) in FIG. 6B. The CPU 14 checks if Y position data of all the character codes is 0. If those are 0, CPU 14 determines that storing of all the character patterns of the second line into work buffer 22 has been completed. Then, CPU 14 performs a line feed process to the next line in accordance with the line feed code of the second line. In this case, as mentioned above the line is L0−n. The line feed L0−n is added to the total line feed L0+n to obtain a new total line feed 2·L0 (step S8). The CPU 14 converts the total line feed 2·L0 into the number of scan lines, and sets the calculated line number in the register Pa (step S9). An increment (e.g., 18) in the accumulated line number is added to the value held by the line feed pointer register P so that the value of the pointer register P becomes 30. Since a character pattern is present in the work buffer 23, the flow advances to step S14. Since the value of the pointer register P is 30 and the line number (Pa - Pb) is 18, the flow advances to step S20. In step S20, the image data of 24 lines is transferred to the adaptor 3. The value of the pointer register P is reduced by 24 to be 6 (step S21), and the contents of the work buffer 23 are compressed by 24 lines (step S22). The flow advances to step S13. Since the document is not completed, the flow returns to step S2, and the above operation is similarly performed for the characters "EFG" on the third line. b) The adaptor receives the data from the work buffer 23 and performs operations such as coding, compression and transmission to be described below.

The CPU 33 temporarily stores in the buffer memory 39 the image data, which is read from the work buffer 23 and transferred from the host system 1 via the interface 31.

The CPU 33 transfers the image data stored in the buffer memory 39 to the CO/DEC circuit 35. The circuit 35 stores the transferred data in the I/0 memory 36. The circuit 35 reads out the image data stored in the I/0 memory 36 and transfers the readout data to the CO/DEC buffer 40. Upon transfer of the image data to the buffer 40, the circuit 35 codes and compresses the image data in accordance with a known coding/compressing method, e.g., an MH mode of the facsimile transmission. In this manner, the data for facsimile transmission is stored in the buffer 40. The compressed data in the buffer 40 is transferred to the modem buffer 41. The transmitter 37 reads out the data from the buffer 41 and outputs the readout data to the communication channel 38.

Figure 7A:
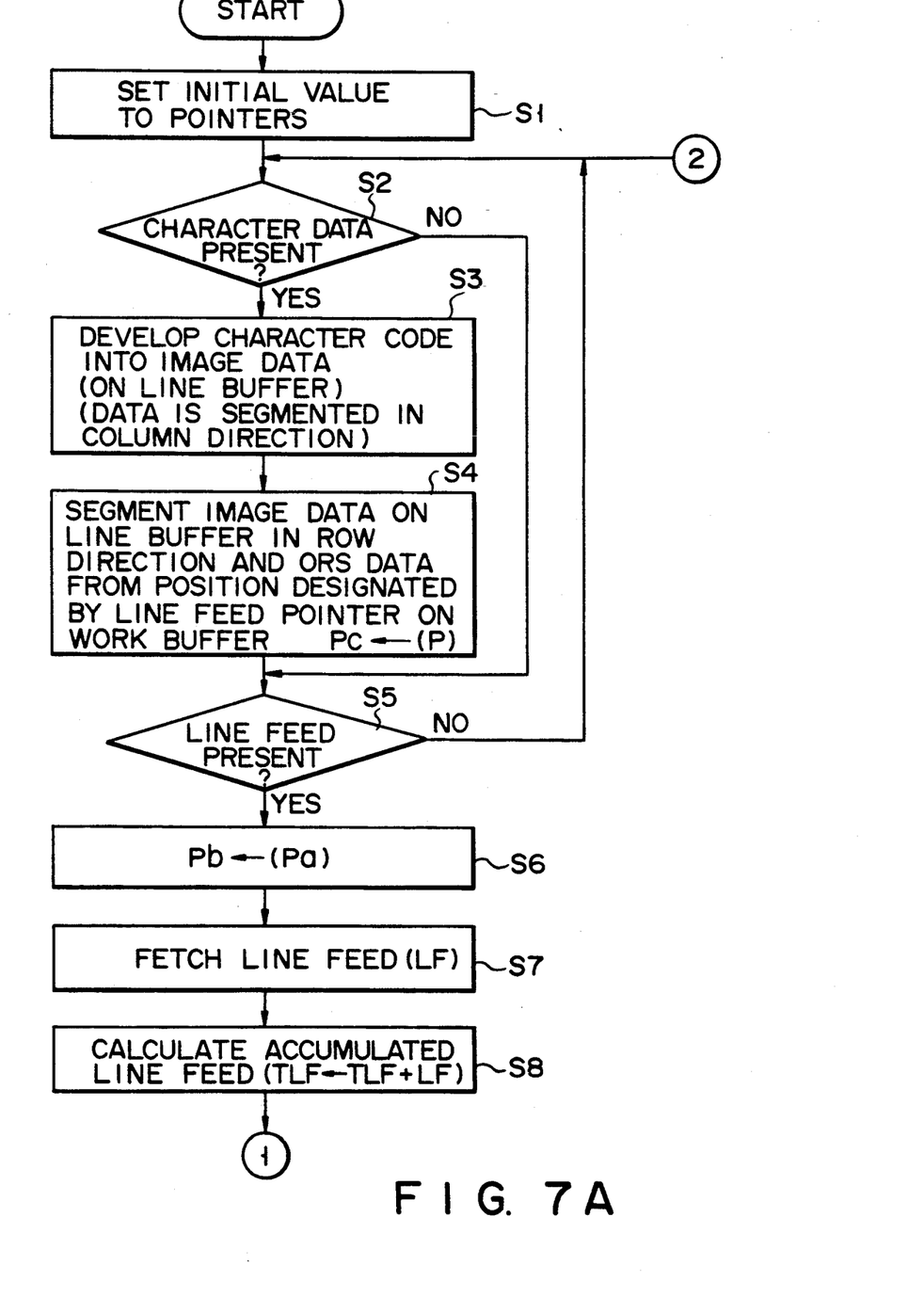
FIGS. 7A and 7B are flow charts for explaining an operation performed by a host system during facsimile transmission.
Figure 7B:
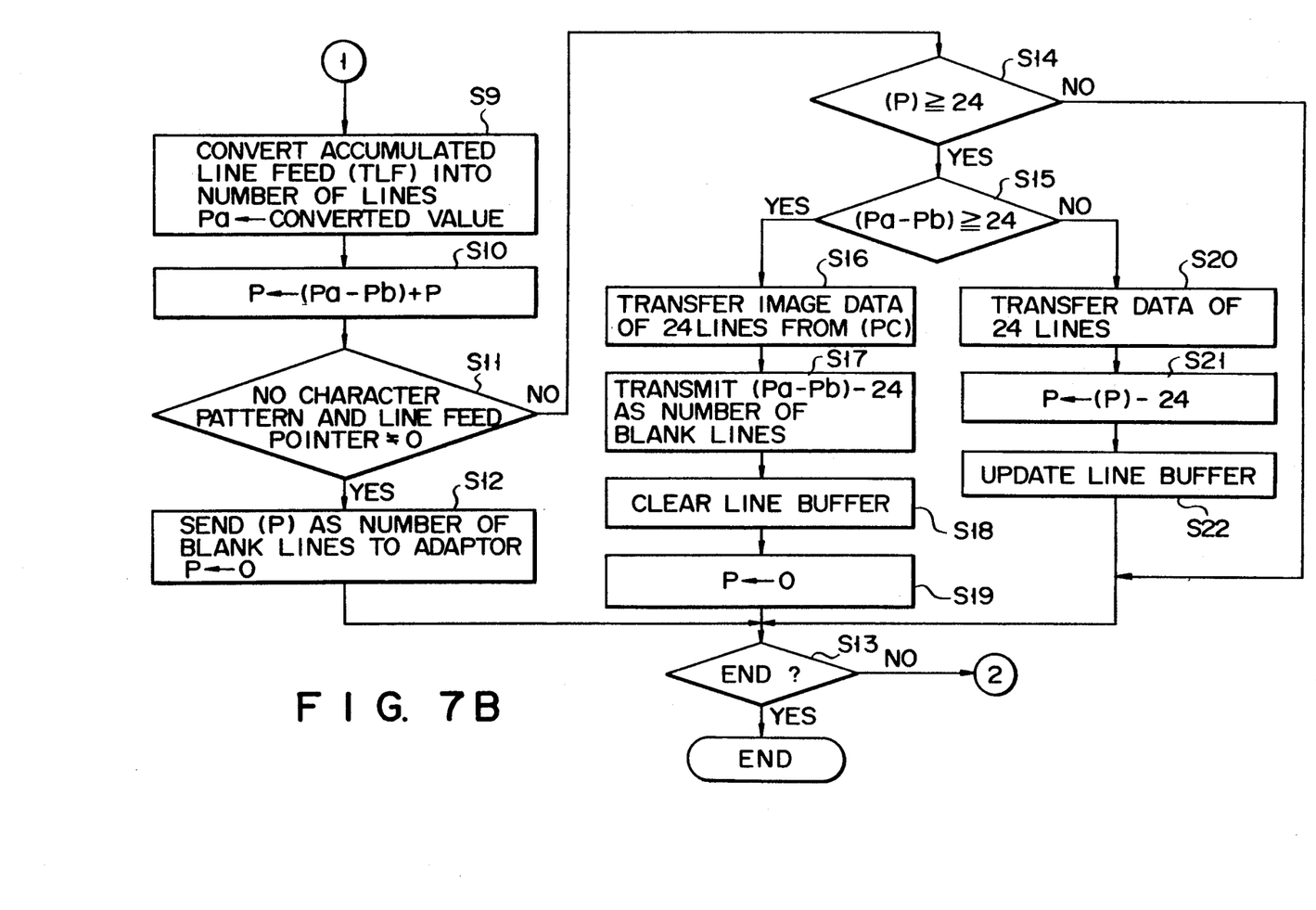
Figure 8:
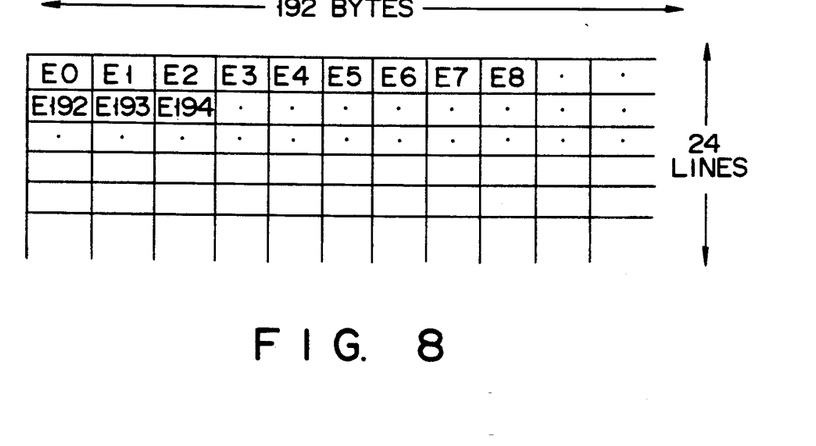

In steps S12 and S17 of FIGS. 7A and 7B, a command representing the number of blank lines is transferred to the adaptor 3 without developing a blank portion of the document into a blank image in the process of image data. In this case, the CPU 33 of the adaptor 3 receives a command representing the number of blank lines from the host system 1. The CPU 33 generates the blank of n lines into image data (a stream of "0" data) on the basis of the received command, and stores the blank image data as image data following other data in the buffer memory 39. While the CPU 33 develops the command into the blank image data and transmits the developed data, the host CPU 14 develops a character code of the next line into image data and stores it in the work buffer 23. In this manner, the operation of the host system 1 and the operation of the adaptor 3 is repeated in parallel. When all lines of one page are completely processed, the CPU 14 transmits a command indicating page end.

When the transmitting operation for all document is finished, the CPU 14 sets a status representing that transmission is normally finished or a status (error code) representing that an error occurs during transmission and the type of error in a facsimile transmission column of the table in memory 19 shown in FIG. 5. If transmission error occurs, the CPU 33 transmits the fact to the CPU 14. CPU 14 generates an error code corresponding to the states of the system 1.

(E) Receiving Operation

The data supplied to the transmitter 37 via the communication channel 38 from other facsimile apparatus is stored in the modem buffer 41. The data in the modem buffer 41 is transferred to the CO/DEC buffer 40. The data in the CO/DEC buffer 40 is transferred to the I/0 memory 36 and the buffer memory 39. The I/0 memory 36 and the buffer memory 39 have FIFO structures.

The CPU 33 decodes the data transferred to the I/0 memory 36 and checks whether information of a line end exists or not. When the CPU 33 obtains the line end information, the CPU 33 performs time monitoring of the channel 38. If no data is received for a predetermined period, the CPU 14 determines that the data receiving is over. The data stored in the I/0 memory 36 is abandoned because it is unnecessary after the line end information is obtained.

The data transferred to the buffer memory 39 is supplied to the host system 1 via the internal bus 32 and the interface 31.

In the host system 1, the image data transmitted from the adaptor 3 is stored in the work buffer 23. When an amount of information stored in the buffer 23 reaches a predetermined value, the CPU 14 sequentially transfers the contents in the buffer 23 to the FDC 15. The FDC 15 controls the FDD 16 to store the coded and compressed data in a floppy disk or the like. Before the receiving operation is started, the CPU 14 seeks a magnetic head of the FDD 16 to an open area of the floppy disk in order to shorten an access time of the FDD 16.

In order to store the received data in the FDD 16, the CPU 14 must assign a file name to the received document. In this embodiment, therefore, the CPU 14 automatically assigns file names FAX01, FAX02, ..., to the received documents in the order of reception of the facsimile data. In addition, the CPU 14 processes a fax data directory shown in FIG. 10 in the floppy disk or the like. The fax data directory includes an entry holding a file name, a start address of a storage area in which a document assigned with the file name is stored, a resolution of the received document (in either a normal or fine mode), a bit representing whether the received document is printed, a telephone number of a destination station, and an error code. Every time a new document is received, the CPU 14 adds data of the received documents to the directory.

(F) Printing of Received Data

In order to print the received document, an operator designates a document name of the document. In response to designation of the document name, the CPU 14 refers the fax data directory and reads out compressed data of the document from the FDD 16. The CPU 14 has a decoding routine for facsimile data. Thus, the CPU 14 decodes the data read out from the FDD 16 and converts the decoded data into image data. The CPU 14 stores the obtained image data in the line buffer 22. When image data, which can be printed by one scan of the print head, is stored in the buffer 22. The data in line buffer 22 is supplied to the printing head of printer 18 in the unit of 24 bits (3 bytes) in the column direction, and the printer 18 prints the pattern data stored in the line buffer 22. The above operation is repeated to print the received document.

Figure 10:
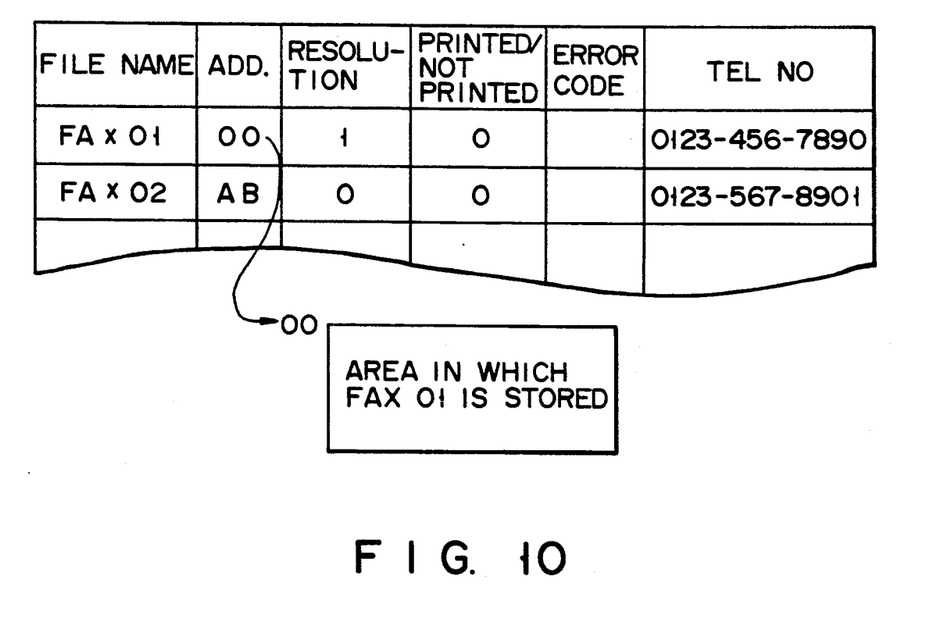
FIG. 10 is a view showing a table listing received documents.

When printing is finished, the CPU 14 sets a flag representing that printing is finished in a column of printed/not printed of the directory shown in FIG. 10.

(G) Document List Printing Operation

When printing of the document list stored in the FDD 16 is designated, the CPU 14 searches the directory shown in FIG. 10, and causes the printer 18 to print the list of the stored documents. The statuses (resolution, printed/not printed and the error code) may be printed together with the document names. Similarly, the document list can be displayed by the display 24. In addition, a list containing documents processed by a normal document-processing apparatus and documents received by a facsimile can be printed.

(H) Dialing Operation

Fax transmission can be performed by an automatic dialing system.

Figure 11A:
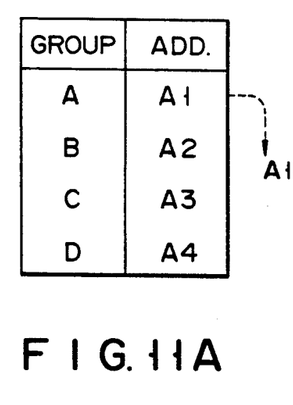
FIGS. 11A and 11B are views showing tables listing data transmission destinations, respectively.

Such an automatic dialing system will be described below with reference to Figs. 11A and 11B. The host system 1 includes a table as shown in FIG. 11A in, e.g., a floppy disk. Each entry of the table stores a start address of a storage area in which a group name and detailed information concerning the group are stored. Each storage area stores destination names, telephone numbers and statuses (representing whether transmission to the destination is completed, whether an error occurred during transmission to the destination and the like) belonging to the corresponding group, as shown in FIG. 11B.

In order to perform automatic dialing, an operator performs a predetermined key operation to display four groups on the display. The operator selects a group to which the destination belongs by a cursor. The CPU 14 reads out displays destination names belonging to the selected group from a storage area corresponding to the selected group. The operator selects a desired destination name by the cursor. The CPU 14 reads out a telephone number of the selected destination name and transfers this number to the adaptor 3. The adaptor 3 performs automatic dialing on the basis of the transferred telephone number.

The same facsimile document can be automatically facsimile-transmitted to all destinations belonging to a certain group. In this case, an operator designates a transmission destination group and a document to be transmitted, and then instructs transmission. In response to the instruction, the CPU 14 sequentially performs dialing to destinations belonging to the group and transmits the designated document. Each time the document is facsimile-transmitted to one destination, the CPU 14 sets a message representing that transmission is normally completed, an error code representing occurrence and type of an error, or a message representing that a facsimile apparatus at the destination is not connected to the communication channel or the like in an entry for holding a status, shown in FIG. 11B.

Figure 11B:
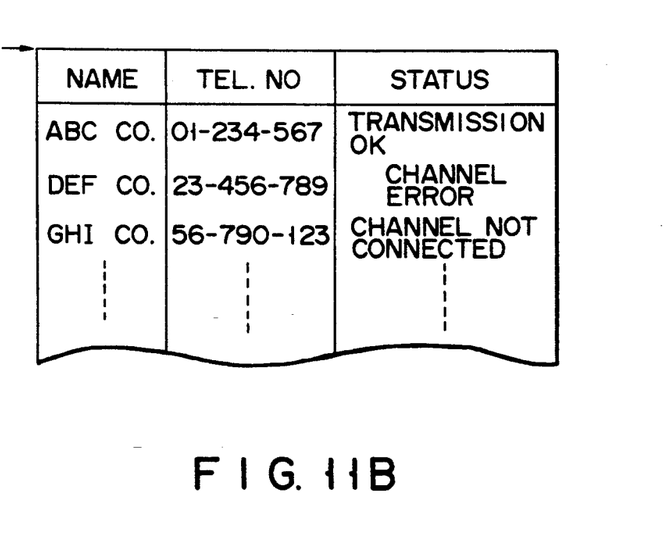

A list of destinations shown in FIGS. 11A and 11B may be printed.

In the above embodiment, the document transmitted to the FDD 16 and the document buffer 21 remains after transmission is finished. The present invention, however, is not limited to this embodiment. For example, after the document is transferred from the host system 1 to the adaptor 3, the CPU 14 may erase the corresponding document file in the system 1.

In the above embodiment, the document is filed in the form of character and control codes in the external memory unit. The document, however, may be stored in the form of image pattern data. Alternatively, the mode of character and control codes and that of image data may be selected by an operator.

In general, a printer of a document-processing apparatus cannot print an image to both side edges of a sheet. A facsimile apparatus, however, adopts a scan system different from that of the printer and can therefore print an image to the extreme side edges of a sheet. Therefore, if an image received by the facsimile apparatus is simply printed by the printer 18, both side edges of the received image sometimes may not be printed. In order to solve this problem, a received image may be reduced in size and then printed by the printer 18. In this case, size reduction or nonreduction of a received image may be selected by an operator.

In the above embodiment, image data is developed into a raster scanner image in the host system 1 and then transmitted to the adaptor 3. In this manner, the adaptor may exclusively perform coding, compression and transmission of the image data, thereby reducing a load on the adaptor 3 and improving a transmission rate. Also, if the adaptor is connected parallel to another apparatus in addition to the host system 1, an operation speed is improved, and a specific operation can be easily added.

In the present invention, image data in the process to be actually output is processed by the work buffer 23, read in the row direction, and then transmitted to the adaptor. Therefore, when a superior or inferior character or the like is to be transmitted, paper feeding control or the like of a facsimile apparatus at a receiving side can be easily performed. In addition, each time the value held by the line feed pointer P exceeds a predetermined value, the contents of the work buffer 23 are transmitted to the adaptor 3 so that the remaining data is compressed toward the start address. For this reason, a transmitting operation can be performed even if the capacity of the work buffer is comparatively small (a minimum capacity is twice that of the line buffer). In the present invention, upon facsimile transmission, the document buffer 21, the line buffer 22 and the like are used in the same manner as in normal document processing. For this reason, the programs for the printing routine and the like of the document-processing apparatus can be partially or entirely used.

Printers generally feed papers in the unit of 120 pitches per inch in the feeding direction, while facsimile device transmits and receives images at 180 lines per inch. Therefore, when the line feed amount of a paper sheet by a printer is converted into the number of scan lines by a facsimile apparatus, a fraction or decimal number always results. Therefore, if the conversion is performed for each line feed, the error, i.e., the accumulated fraction, will be large at the end portion of the page. As a result, there will be a large difference between the transmitting image and the received image. However, in the above embodiment, the total line feed amount (value maintained in TLF) is calculated (step S8), and the total line feeding amount is converted into the number of scan lines by the facsimile apparatus (step S9) in order to obtain the scan line number to be line-fed (step 10). Therefore, error due to the conversion from the paper feeding amount to scan line number can be minimized.

In the above embodiment, each character is displayed by 24 dots. A character, however, may be displayed by any number of dots.

What is claimed is:

1. A document-processing apparatus for inputting and editing document data and being capable of facsimile-transmitting the document data without printing the document data to a destination facsimile apparatus, said destination facsimile apparatus printing output data in a predetermined scan direction, said document-processing apparatus comprising:

a document-processing apparatus main body for inputting and editing document data of an arbitrary document, said document data including character codes, said main body having, memory means for storing said document data, designating means for designating a transmission of said document data to said destination facsimile apparatus, developing means, connected to said memory means and said designating means, for developing said document data stored in said memory means into image data in response to the designation from said designation means, synthesizing means, connected to said developing means, for transforming said image data developed by said developing means such that said image data can be printed by said destination facsimile apparatus, and output means for reading and outputting the image data transformed by said synthesizing means in a manner corresponding to said scan direction; and an adaptor, detachably connected to said document-processing apparatus main body, for facsimile-transmitting the document data processed by said document-processing apparatus main body to said destination facsimile apparatus, said adapter being capable of operating in parallel with said document-processing apparatus main body and having, converting means, connected to said output means, for converting said transformed image data from said output means into facsimile data, and transmitting means for transmitting said facsimile data to a communication channel.

2. An apparatus according to claim 1, wherein said adapter comprises:

receiving means, for connection to said communication channel and for receiving facsimile data from said destination facsimile apparatus, and transferring means for transferring the facsimile data received by said receiving means to said document-processing apparatus main body;

and wherein said document-processing apparatus main body comprises:

memory means for storing the facsimile data transferred by said adapter, and decoding means for converting the facsimile data store in said memory means into image data.

3. An apparatus according to claim 1, wherein said synthesizing means comprises:

line buffer means for storing image data corresponding to one line of a document; and work buffer means for synthesizing the image data stored in said line buffer means to transform and store said image data such that it can be printed by said destination facsimile apparatus.

4. An apparatus according to claim 3, wherein:

said developing means comprises means for developing document data corresponding to said one line of the document into said image data corresponding to said one line of the document into said image data corresponding to said one line of the document, for reading the developed image data in a column direction in units of a predetermined number of bits, and for storing the read image data in said line buffer means;

said synthesizing means comprises means for ORing the image data stored in said line buffer means with the image data stored in said work buffer means, and means for storing said ORed image data in said work buffer means, to form a print image; and said output means comprises means for reading and transmitting, in said units of a predetermined number of bits, the ORed image data stored in said work buffer means in a row direction, said row direction corresponding to said scan direction.

5. A document-processing apparatus having a facsimile function for inputting and editing document data and being capable of transmitting the document data without printing the document data, comprising:

processing means for inputting and editing document data of a document;

memory means for storing the document data input and edited by said processing means;

designating means for designating a transmission of said document data to a destination facsimile apparatus, said destination facsimile apparatus printing scan lines of output data in a predetermined scan direction;

developing means, connected to said memory means and said designating means, for developing said document data stored in said memory means into image data and for converting a blank portion of said document into a command representing a number of said scan lines of said destination facsimile apparatus, in response to the designation of said designating means; and output means, connected to said developing means and being capable of operating in parallel with said memory means, said designating means, and said developing means, for receiving the command and the image data from said developing means, for developing the command into blank image data, for converting the image data and the blank image data into facsimile data, and for outputting the facsimile data to said destination facsimile apparatus.

6. An apparatus according to claim 5, comprising:

an apparatus main body including said memory means, said designating means, and said developing means an apparatus main body for processing an arbitrary document; and a facsimile-transmission adaptor, detachably connected to said apparatus main body, for transmitting said document data processed by said apparatus main body to said destination facsimile apparatus, said adapter including said output means.

7. An apparatus according to claim 6, wherein said adaptor includes:

receiving means for receiving facsimile data from said destination facsimile apparatus and transferring the received facsimile data to said apparatus main body;

memory means for storing the facsimile data received by said receiving means; and converting means, connected to said memory means, for converting the facsimile data stored in said memory means into image data.

8. An apparatus according to claim 5, wherein said developing means comprises:

line buffer means for storing image data corresponding to one line of the document;

work buffer means for storing image data stored in said line buffer means, said work buffer means having a capacity twice that of said line buffer means in a column direction;

a pointer P for designating image data stored in said work buffer means;

means for developing document data corresponding to said one line of the document into said image data corresponding to said one line of said document and for storing said image data in said line buffer means;

means for ORing said image data stored in said line buffer means with image data designated by said pointer P, and for storing said ORed image data in said work buffer means;

means for fetching a quantity of line feed from the developed document data to designate document data corresponding to a next line of the document;

means for calculating an accumulated line feed and for converting the accumulated line feed into a corresponding number of said scan lines;

means for calculating an increment of said scan lines;

means for adding the increment of said scan lines to an original designated value of said pointer P, to obtain a new designated value;

means for converting the new designated value of said pointer P into a number of blank lines when no character code is present in said work buffer means and when the new designated value of said pointer P is not zero; and means for transferring image data corresponding to (the original designated value of said pointer P plus a number of said scan lines corresponding to one line of the document) to said output means, for converting (the increment of said scan lines minus the number of said scan lines corresponding to one line of the document) as a number of blank lines into a command, and for transferring the command to said output means, when no character code is present in said work buffer means and the new designated value of said pointer P is not zero, and when the sum of the new designated value of said pointer P and the increment of said scan lines is greater than the number of said scan lines corresponding to one line of the document.

9. A data-processing apparatus for inputting and editing document data and being capable of facsimile-transmitting the document data without printing the document data, comprising:

document-processing means for inputting and editing document data, said document data including character codes; and adaptor means, connected to said document-processing means so as to operate in parallel with said document-processing means, for facsimile-transmitting the document data input and edited by said document-processing means.

10. An apparatus according to claim 9, wherein said adaptor means is detachably connected to said document-processing means.

11. The apparatus according to claim 9, wherein said adaptor means includes connector means for being detachably connected to said document-processing means.

12. An apparatus according to claim 9, wherein said document-processing means comprises:

means for storing document data corresponding to a plurality of documents;

means for storing a list of said plurality of documents; and means for storing status information representing a facsimile-transmission of document data corresponding to one of said documents.

13. An apparatus according to claim 9, wherein said document-processing means comprises:

memory means for storing said document data.

facsimile transmission designating means for designating a facsimile transmission, and developing means for developing said document data into image data in response to the designation from said designating means;

and wherein said adapter means comprises:

converting means for converting said image data into facsimile data, and transmitting means for transmitting said facsimile data to a communication channel.

14. An apparatus according to claim 9, wherein said document-processing means comprises:

means for processing image data corresponding to a printed image of a document, means for reading said image data in a manner corresponding to a scan direction of a facsimile apparatus, and means for transferring said read image data to said adaptor;

and wherein said adaptor comprises:

means for converting said image data from said document processing means into facsimile data, and means for outputting said facsimile data to a communication channel.

15. An apparatus according to claim 9, wherein said document-processing means comprises:

means for converting the document data into image data, means for transferring the image data to said adaptor means, means for converting at least a part of a blank portion of the document into a number of scan lines corresponding to a blank portion of a facsimile apparatus, and means for transferring a command representing the number of scan lines to said adaptor means;

and wherein said adaptor means comprises:

means for converting the image data transferred by said document-processing means into facsimile transmission data, means for transmitting said facsimile transmission data to a communication channel, means for converting the command into blank image data, means for adding the blank image data to the image data from said document-processing means, means for converting the added image data and blank image data into facsimile data, and means for transmitting the facsimile data to a communication channel.

16. An apparatus according to claim 9, wherein said adaptor means comprises means for receiving facsimile data from a facsimile apparatus, and wherein said document-processing means includes means for storing the facsimile data received by said adaptor means, for converting the facsimile data into image data, and for outputting the image data.

17. An apparatus according to claim 16, wherein said document-processing means comprises:

a list of files corresponding to said received facsimile data;

means for generating a name corresponding to each of the files corresponding to said received facsimile data;

means for adding said names to the list; and means for adding status information to an output file of the list, said status information representing a receipt of said facsimile data.

18. A document-processing apparatus for transmitting document data to a destination facsimile apparatus, said destination facsimile apparatus printing output data in a predetermined scan direction, said document-processing apparatus comprising:
- a document-processing apparatus main body for processing document data of an arbitrary document, said document data including character codes, said main body having:
  - memory means for storing said document data,
  - designating means for designating a transmission of said document data to said destination facsimile apparatus,
  - developing means, connected to said memory means and said designating means, for developing said document data into image data in response to the designation from said designating means,
  - synthesizing means, connected to said developing means, for transforming said image data such that said image data can be printed by said destination facsimile apparatus, said synthesizing means including,
    - line buffer means for storing image data corresponding to one line of a codument, and
    - work buffer means for synthesizing the image data stored in said line buffer means to transform and store said image data such that it can be printed by said destination facsimile apparatus, and
  - output means for reading and outputting the image data transformed by said synthesizing means in a manner corresponding to said scan direction; and
- an adaptor, connected to said document-processing apparatus main body, for facsimile-transmitting the document data processed by said document-processing apparatus main body to said destination facsimile apparatus, said adapter having:
  - converting means, connected to said output means, for converting said transformed image data from said output means into facsimile data, and
  - transmitting means for transmitting said facsimile data to a communication channel.

19. An apparatus according to claim 18, wherein:
said developing means comprises means for developing document data corresponding to said one line of the document into said image data corresponding to said one line of the document, for reading the developed image data in a column direction in units of a predetermined number of bits, and for storing the read image data in said line buffer means;
said synthesizing means comprises means for ORing the image data stored in said line buffer means with the image data stored in said work buffer means, and means for storing said ORed image data in said work buffer means, to form a print image; and
said output means comprises means for reading and transmitting, in said units of a predetermined number of bits, the ORed image data stored in said work buffer means in a row direction, said row direction corresponding to said scan direction.

20. A document-processing apparatus having a facsimile function, comprising;
memory means for storing document data of a document, said document data including character codes;
designating means for designating a transmission of said document data to a destination facsimile apparatus, said destination facsimile apparatus printing scan lines of output data in a predetermined scan direction;
developing means, connected to said memory means and said designating means, for developing said document data into image data and for converting a blank portion of said document into a command representing a number of said scan lines of said destination facsimile apparatus, in response to said transmission designated by said designating means, said developing means having,
- line buffer means for storing image data corresponding to one line of said document,
- work buffer means for storing image data stored in said line buffer means, said work buffer means having a capacity twice that of said line buffer means in a column direction,
- a pointer P for designating image data stored in said work buffer means,
- means for developing document data corresponding to said one line of the document into said image data corresponding to said one line of said document and for storing said image data in said line buffer means,
- means for ORing said image data stored in said line buffer means with image data designated by said pointer P, and for storing said ORed image data in said work buffer means,
- means for fetching a quantity of line feed from the developed document data to designate document data corresponding to a next line of the document,
- means for calculating an accumulated line feed and for converting the accumulated line feed into a corresponding number of said scan lines,
- means for calculating an increment of said scan lines,
- means for adding the increment of said scan lines to an original designated value of said pointer P, to obtain a new designated value,
- means for converting the new designated value of said pointer P into a number of blank lines when no character code is present in said work buffer means and when the new designated value of said pointer P is not zero, and
- means for transferring image data corresponding to (the original designated value of said pointer P plus a number of said scan lines corresponding to one line of the document) to said output means, for converting (the increment of said scan lines minus the number of said scan lines corresponding to one line of the document) as a number of blank lines into a command, and for transferring the command to said output means, when no character code is present in said work buffer means and the new designated value of said pointer P is not zero, and when the sum of the new designated value of said pointer P and the increment of said scan lines is greater than the number of said scan lines corresponding to one line of the document; and output means, connected to said developing means, for receiving the command and the image data from said developing means, for developing the command into blank image data, for converting the image data and the blank image data into facsimile data, and for outputting the facsimile data to said destination facsimile apparatus.

* * * * *